United States Patent
Suganuma et al.

(10) Patent No.: US 10,875,097 B2
(45) Date of Patent: Dec. 29, 2020

(54) SILVER PARTICLE PRODUCING METHOD, SILVER PARTICLES, AND SILVER PASTE

(71) Applicant: OSAKA UNIVERSITY, Osaka (JP)

(72) Inventors: Katsuaki Suganuma, Suita (JP); Jinting Jiu, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 320 days.

(21) Appl. No.: 15/746,902

(22) PCT Filed: Jul. 22, 2016

(86) PCT No.: PCT/JP2016/071627
§ 371 (c)(1),
(2) Date: Jan. 23, 2018

(87) PCT Pub. No.: WO2017/018359
PCT Pub. Date: Feb. 2, 2017

(65) Prior Publication Data
US 2020/0086391 A1    Mar. 19, 2020

(30) Foreign Application Priority Data
Jul. 24, 2015 (JP) .................. 2015-146958

(51) Int. Cl.
*B22F 1/00* (2006.01)
*H01B 1/22* (2006.01)
(Continued)

(52) U.S. Cl.
CPC .............. *B22F 9/24* (2013.01); *B22F 1/0022* (2013.01); *C09J 1/00* (2013.01); *C09J 9/02* (2013.01);
(Continued)

(58) Field of Classification Search
CPC ...... H05K 3/106; B22F 1/0022; B22F 1/0048; B22F 2301/255; B22F 9/24; B82Y 40/00
(Continued)

(56) References Cited

U.S. PATENT DOCUMENTS 9,496,068 B2   11/2016   Kurihara et al.
2009/0272560 A1*  11/2009   Tokunaga .............. H05K 3/106
                                                              174/126.1
(Continued)

FOREIGN PATENT DOCUMENTS

JP    H06-172822 A    6/1994
JP    2004-183010 A    7/2004
(Continued)

OTHER PUBLICATIONS

P.S. Mdluli et al.; "An improved N, N-dimethylformamide and polyvinyl pyrrolidone approach for the synthesis of long silver nanowires"; Journal of Alloys and Compounds, Elsevier; Feb. 5, 2009; pp. 519-522; vol. 469, No. 1-2.
(Continued)

*Primary Examiner* — Khanh T Nguyen
(74) *Attorney, Agent, or Firm* — Studebaker & Brackett PC

(57) ABSTRACT

First, a liquid mixture is obtained by mixing at least a silver compound, a reductant, and a dispersant (S1). Then, the liquid mixture is heated to cause reaction between the silver compound and the reductant and generate first silver particles each having a sheet-like or plate-like shape and second silver particles each having a spherical shape or a shape closer to a sphere than the first silver particles and a particle diameter smaller than a maximum value of a length of a side of each of the first silver particles (S2).

13 Claims, 13 Drawing Sheets

(51) Int. Cl.
  *B22F 9/24*  (2006.01)
  *C09J 1/00*  (2006.01)
  *C09J 9/02*  (2006.01)

(52) U.S. Cl.
  CPC ........ *H01B 1/22* (2013.01); *B22F 2001/0037* (2013.01); *B22F 2301/255* (2013.01)

(58) Field of Classification Search
  USPC ..................................................... 174/126.1
  See application file for complete search history.

(56) References Cited

U.S. PATENT DOCUMENTS

| 2012/0043510 | A1 | 2/2012 | Kurihara et al. | |
|---|---|---|---|---|
| 2013/0202909 | A1* | 8/2013 | Byun .................... | B22F 1/0018 428/546 |

FOREIGN PATENT DOCUMENTS

| JP | 2005-105376 | A | | 4/2005 | |
|---|---|---|---|---|---|
| JP | 2007-138249 | A | | 6/2007 | |
| JP | 2007-138250 | A | | 6/2007 | |
| JP | 2009-144188 | A | | 7/2009 | |
| JP | 2010-265543 | A | | 11/2010 | |
| JP | 2011-100573 | A | | 5/2011 | |
| JP | 2012-052198 | A | | 3/2012 | |
| JP | 5207281 | B2 | | 6/2013 | |
| KR | 2006-0132076 | A | * | 12/2006 | ................ B22F 9/24 |
| WO | 2012/147945 | A1 | | 11/2012 | |

OTHER PUBLICATIONS

Zhu Xuanmin et al.: "Effect of polyvinyl pyrrolidone molecular weight on the silver morphology synthesized by N, N-dimethylformamide reduction"; Key Engineering Materials; Jan. 1, 2012; pp. 245-252; vol. 509.
The extended European search report issued by the European Patent Office dated Mar. 14, 2019, which corresponds to European Patent Application No. 16830464.0-1103 and is related to U.S. Appl. No. 15/746,902.
International Search Report issued in PCT/JP2016/071627; dated Oct. 25, 2016.
Masafumi Kuramoto et al.; "Die Bonding for a Nitride Light-Emitting Diode by Low-Temperature Sintering of Micrometer Size Silver Particles"; IEEE Transactions on Components and Packaging Technologies; Dec. 2010; pp. 801-808; vol. 33, No. 4.
K. Suganuma et al.; "Low-temperature low-pressure die attach with hybrid silver particle paste"; Microelectronics Reliability 52; 2012; pp. 375-380.
Daisuke Wakuda et al.; "Ag Nanoparticle Paste Synthesis for Room Temperature Bonding"; IEEE Transactions on Components and Packaging Technologies; Jun. 2010; pp. 437-442; vol. 33, No. 2.
Isabel Pastoriza-Santos et al.; "Synthesis of Silver Nanoprisms in DMF"; Nano Letters; Jul. 19, 2002; pp. 903-905; vol. 2, No. 8.
Ruo-Zhou Li et al.; "Robust Ag nanoplate ink for flexible electronics packaging"; Nanoscale; 2015; pp. 7368-7377; vol. 7, Issue 16.
Ruo-Zhou Li et al.; Supplementary Information "Robust Ag Nanoplate Ink for Flexible Electronics Packaging"; Electronic Supplementary Material (ESI) for Nanoscale; pp. 1-4.

* cited by examiner

SILVER PARTICLE PRODUCING METHOD, SILVER PARTICLES, AND SILVER PASTE

TECHNICAL FIELD

The present invention relates to a silver particle producing method, silver particles, and a silver paste.

BACKGROUND ART

As a bonding material for electronic components and a material of a print wiring, a silver paste produced by dispersing silver microparticles (silver particles having particle diameters of micrometer order) in an organic solvent is practically used. The silver microparticles function as a conductive material in the silver paste. The organic solvent is typically an alcohol. However, a high temperature not lower than 250° C. and a pressure (pressure application) are required for sintering (baking) the silver paste that contains the silver microparticles only. Therefore, the silver paste that contains the silver microparticles cannot be used for electronic components and a wiring board that have low heat resistance. Under the above circumstances, silver nanoparticles (silver particles having particle diameters of nanometer order) that permit sintering at low temperatures have been recently used instead of the silver microparticles. A method for producing the silver nanoparticles is disclosed in Patent Literature 1 for example.

CITATION LIST

Patent Literature

[Patent Literature 1]
Japanese Patent Application Laid-Open Publication No. 2010-265543

SUMMARY OF INVENTION

Technical Problem

However, packability of spherical silver nanoparticles (packing density of the silver particles) is insufficient. Therefore, bonding strength achieved by the use of a silver paste that contains the spherical silver nanoparticles only is low.

The present invention was made in view of the above-described problems, and it is a first object of the present invention to provide a silver particle producing method that permits production of silver particles packability of which can be improved easily. Also, a second object of the present invention is to provide the silver particles packability of which can be improved easily, and a third object of the present invention is to provide a silver paste that contains the silver particles packability of which can be improved easily.

Solution to Problem

A silver particle producing method of the present invention includes: obtaining a liquid mixture by mixing at least a silver compound, a reductant, and a dispersant; and heating the liquid mixture to cause reaction between the silver compound and the reductant and generate first silver particles and second silver particles, the first silver particles each having a sheet-like or plate-like shape, and the second silver particles each having a spherical shape or a shape closer to a sphere than the first silver particles and a particle diameter smaller than a maximum value of a length of a side of each of the first silver particles.

In an embodiment, the reaction between the silver compound and the reductant is caused under conditions where the liquid mixture maintains a liquid phase.

In an embodiment, the reductant is N,N-dimethylformamide.

In an embodiment, the liquid mixture further contains pure water.

In an embodiment, the reaction between the silver compound and the reductant is caused under atmospheric pressure.

Silver particles of the present invention include first silver particles each having a sheet-like or plate-like shape of a polygonal contour and second silver particles each having a spherical shape or a shape closer to a sphere than the first silver particles and a particle diameter smaller than a maximum value of a length of a side of each of the first silver particles. An average value of the lengths of the sides of the first silver particles is at least 100 nm and no greater than 800 nm. An average value of the particle diameters of the second silver particles is at least 10 nm and no greater than 100 nm.

In an embodiment, the length of the side of each of the first silver particles is at least 10 nm and no greater than 800 nm.

In an embodiment, the first silver particles each have a triangular or hexagonal contour.

In an embodiment, a maximum value of a length of a side of each of the first silver particles having the triangular contour is at least 50 nm.

In an embodiment, a maximum value of a length of a side of each of the first silver particles having the hexagonal contour is at least 30 nm.

In an embodiment, the particle diameter of each of the second silver particles is at least 20 nm and no greater than 300 nm.

In an embodiment, the particle diameter of each of the second silver particles is no greater than 150 nm.

In an embodiment, a thickness of each of the first silver particles is at least 10 nm and no greater than 100 nm.

In an embodiment, the thickness of each of the first silver particles is no greater than 30 nm.

A silver paste of the present invention contains silver particles produced by the above-described method or the above-described silver particles.

Advantageous Effects of Invention

According to the silver particle producing method of the present invention, it is possible to produce silver particles packability of which can be improved easily. Also, according to the silver particles of the present invention, packability of the silver particles can be improved easily. Also, according to the silver paste of the present invention, the silver paste can contain silver particles packability of which can be improved easily.

DESCRIPTION OF EMBODIMENTS

The following describes an embodiment of the present invention with reference to the drawings. However, the present invention is not limited to the embodiment described below, and is practicable in various manners within a scope not departing from the gist of the present invention. Note that some overlapping explanations may be appropriately omitted.

Figure 1:
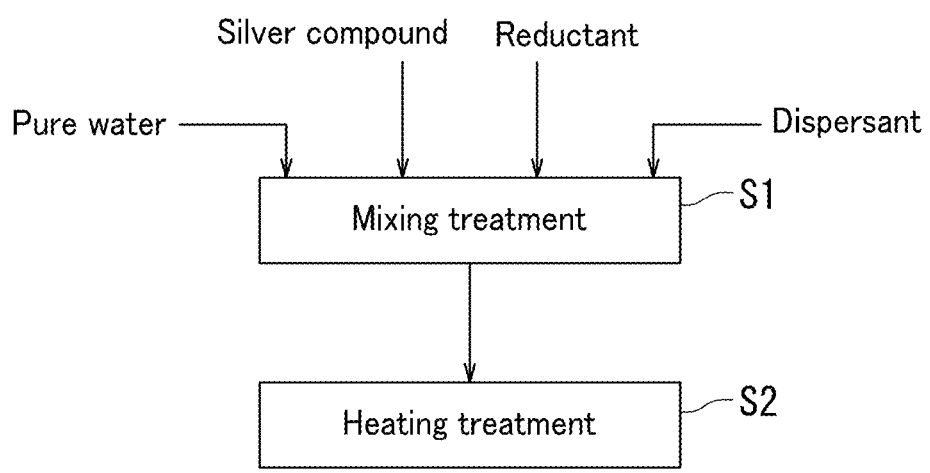
FIG. 1 is a flowchart illustrating a silver particle producing method according to an embodiment of the present invention.

First, a silver particle producing method and silver particles according to the present embodiment will be described with reference to FIG. 1. FIG. 1 is a flowchart illustrating the silver particle producing method according to the present embodiment. As illustrated in FIG. 1, the silver particle producing method according to the present embodiment includes a mixing treatment process S1 and a heating treatment process S2.

In the mixing treatment process S1, a liquid mixture M is prepared by mixing pure water W, a silver compound C, a reductant R, and a dispersant D. Alternatively, the liquid mixture M is prepared by mixing the silver compound C, the reductant R, and the dispersant D. When the pure water W is not used, a reductant R that can serve as a solvent is used. Note that the components of the liquid mixture M may be added in any order. Also, the heating treatment process S2 is preferably performed after mixing the components of the liquid mixture M appropriately by stirring the liquid mixture M in order to facilitate reaction between the silver compound C and the reductant R.

In the heating treatment process S2, the liquid mixture M is heated to cause the reaction (liquid phase reduction) between the silver compound C and the reductant R. A reaction temperature is preferably set to a temperature at which the liquid mixture M can maintain a liquid phase in the heating treatment process S2. Also, heating treatment is preferably performed while stirring the liquid mixture M at a specific rotational speed [rpm] in order to facilitate the reaction between the silver compound C and the reductant R. Note that the rotational speed [rpm] may be determined to be any value.

Silver particles P are generated (precipitated) through the heating treatment process S2. The silver particles P include silver particles P1 (first silver particles) having a sheet-like or plate-like shape and silver particles P2 (second silver particles) having a spherical shape. Hereinafter, "sheet-like or plate-like" will be described as "sheet-like". The silver particles P2 (hereinafter may be referred to as spherical silver particles P2) having the spherical shape each have a spherical shape or a shape closer to a sphere than the silver particles P1 (hereinafter may be referred to as sheet-like silver particles P1) having the sheet-like shape. Also, the spherical silver particles P2 each have a particle diameter smaller than a maximum value of the length of a side of each sheet-like silver particle P1.

The silver particle producing method according to the present embodiment permits production of the silver particles (the sheet-like silver particles P1) each having the sheet-like shape and the silver particles (the spherical silver particles P2) each having the spherical shape and a particle diameter smaller than a maximum value of the length of a side of each sheet-like silver particle. Therefore, the silver particles P having improved packability can be produced. Packability is improved by the combination of the silver particles (the sheet-like silver particles P1) each having the sheet-like shape and the silver particles (the spherical silver particles P2) each having the spherical shape and a particle diameter smaller than a maximum value of the length of a side of each sheet-like silver particle, since the spherical silver particles fill gaps between the sheet-like silver particles.

When the pure water W is used, the amount (rate) of the pure water W in the reaction system may be determined in advance in accordance with set conditions, since an optimal amount changes depending on the conditions such as amounts of the other components of the liquid mixture M and a reaction temperature. Use of the pure water W permits generation of the sheet-like silver particles P1 of an adequate size at a reaction temperature lower than that required when the pure water W is not used. Typically, the smaller the amount (rate) of the pure water W is, the smaller the size of the sheet-like silver particles P1 tends to be. Therefore, in order that the sheet-like silver particles P1 have an adequate size, the amount of the pure water W is preferably for example at least 40 parts by weight and smaller than 100 parts by weight relative to 100 parts by weight of the liquid mixture M in the reaction system, and more preferably at least 60 parts by weight and no greater than 80 parts by weight.

The silver compound C is not particularly limited, and representative examples of the silver compound include silver nitrate, silver acetate, and silver carboxylate. Two or more silver compounds may be used in combination. The amount (rate) of the silver compound C in the reaction system may also be determined in advance in accordance with set conditions, since an optimal amount changes depending on the conditions such as amounts of the other components of the liquid mixture M and the reaction temperature. Typically, the amount of the silver compound is preferably at least 0.1 parts by weight and no greater than 20 parts by weight relative to 100 parts by weight of the liquid mixture M in the reaction system, and more preferably at least 0.5 parts by weight and no greater than 10 parts by weight.

The reductant R is not particularly limited as long as the reductant can reduce the silver compound C. Representative examples of the reductant include N,N-dimethylformamide (DMF), ethylene glycol, propylene glycol, 1,3-propanediol, 1,4-butanediol, glycerin, ethanol, glucose, ascorbic acid, $NaBH_4$, and hydrazine. Alternatively, two or more reductants may be used in combination as the reductant R.

The amount (rate) of the reductant R in the reaction system may also be determined in advance in accordance with set conditions, since an optimal amount changes depending on the conditions such as amounts of the other components of the liquid mixture M and the reaction temperature. Typically, the amount of the reductant is preferably at least 10 parts by weight and smaller than 100 parts by weight relative to 100 parts by weight of the liquid mixture M in the reaction system, and more preferably at least 20 parts by weight and no greater than 80 parts by weight.

The dispersant D is also not particularly limited. Representative examples of the dispersant include polyvinylpyrrolidone (PVP), polyethylene glycol (PEG), and cetyltrimethylammonium bromide (CTAB). Two or more dispersants may be used in combination as the dispersant D. The amount (rate) of the dispersant D in the reaction system may also be determined in advance in accordance with set conditions, since an optimal amount changes depending on the conditions such as amounts of the other components of the liquid mixture M and the reaction temperature. Typically, the larger the amount (rate) of the dispersant D is, the higher a production yield of the silver particles P is and the smaller the size of the sheet-like silver particles P1 is. Therefore, in order that the sheet-like silver particles P1 have an adequate size, the amount of the dispersant D is preferably for example at least 0.1 parts by weight and no greater than 20 parts by weight relative to 100 parts by weight of the liquid mixture M in the reaction system, and more preferably at least 0.5 parts by weight and no greater than 10 parts by weight.

The silver particle producing method according to the present embodiment is performed in an environment that is not particularly limited, and can be performed for example in an atmosphere at atmospheric pressure and room temperature. Also, the reaction temperature may also be determined in advance in accordance with set conditions, since an optimal temperature changes depending on the conditions such as amounts (rates) of the components of the liquid mixture M and the environment. Typically, the higher the reaction temperature is, the higher the production yield of the silver particles P tends to be and the larger the thickness of the sheet-like silver particles P1 and the particle diameter of the spherical silver particles P2 tend to be.

For example, when the pure water W is used, the reaction temperature is preferably 100° C. or higher. A reaction temperature lower than 100° C. may result in failure to generate the sheet-like silver particles P1 having a desired size depending on the amounts (rates) of the components of the liquid mixture M and a time (hereinafter may be referred to as a reaction time) of heating the liquid mixture M. Also, when the pure water W is used, the reaction temperature is preferably lower than 150° C. This is because the sheet-like silver particles P1 may be uncontrollable to the desired size depending on the amounts (rates) of the components of the liquid mixture M and the reaction time. Further, a reaction temperature of 150° C. or higher may result in failure to generate the sheet-like silver particles P1 or generation of only a small amount of the sheet-like silver particles P1 depending on the amounts (rates) of the components of the liquid mixture M and the reaction time. By contrast, when the pure water W is not used, the reaction temperature is typically set to a temperature higher than that employed when the liquid mixture M contains the pure water W. This is because it may be impossible to generate the sheet-like silver particles P1 depending on the amounts (rates) of the components of the liquid mixture M and the reaction time. When the pure water W is not used, the reaction temperature can be set to be 150° C. or higher for example.

The reaction time is also not particularly limited, and can be set to any value in accordance with the amounts (rates) of the components of the liquid mixture M, the reaction temperature, and the like. However, the reaction time is preferably for example not longer than three hours since an excessively long reaction time results in a decrease in production efficiency.

Figure 2:
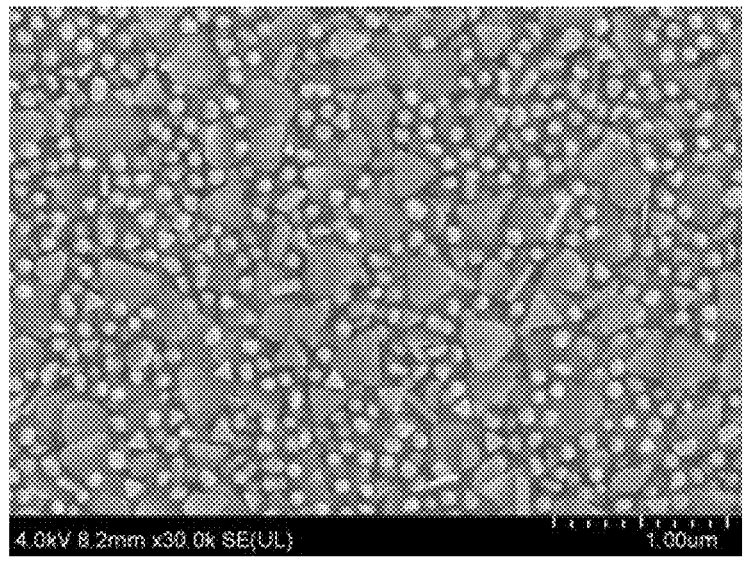
FIG. 2 is a photograph showing an SEM image according to example 1 of the present invention.

The silver particles P (the sheet-like silver particles P1 and the spherical silver particles P2) produced by the silver particle producing method according to the present embodiment can be observed using a scanning electron microscope (SEM) for example. FIG. 2 shows an example of an SEM image of the produced silver particles P (the sheet-like silver particles P1 and the spherical silver particles P2).

As shown in FIG. 2, the produced silver particles P include the sheet-like silver particles P1 and the spherical silver particles P2 each having a particle diameter smaller than a maximum value of the length of a side of each sheet-like silver particle P1. The spherical silver particles P2 each have a spherical shape or a shape closer to a sphere than the sheet-like silver particles P1. By contrast, most of the sheet-like silver particles P1 have a triangular or hexagonal contour. Note that the triangular or hexagonal contour includes shapes resembling a triangle or a hexagon. For example, each side may be arced (curved) rather than straight. Also, an intersection of sides (i.e., a so-called vertex) may be rounded (curved). A ratio between the sheet-like silver particles P1 having a triangular contour and the sheet-like silver particles P1 having a hexagonal contour is controllable by adjusting an amount of addition of the dispersant D. Specifically, the rate of the sheet-like silver particles P1 having the triangular contour increases along with an increase in the amount of addition of the dispersant D, and the rate of the sheet-like silver particles P1 having the hexagonal contour increases along with a decrease in the amount of addition of the dispersant D.

The length of a side of each sheet-like silver particle P1 (when the side is arced, the length of a straight line connecting opposite ends of the side) is controllable by adjusting the amounts (rates) of the components of the liquid mixture M and the reaction temperature. For example, the larger the amount (rate) of the pure water W is, the larger the length of a side of each sheet-like silver particle P1 tends to be. Also, the higher the reaction temperature is, the larger the length of a side of each sheet-like silver particle P1 tends to be. In the present embodiment, the length of a side of each sheet-like silver particle P1 is at least 10 nm and no greater than 800 nm.

In order to improve packability of the silver particles P, a maximum value of the length of a side of each sheet-like silver particle P1 having the triangular contour is preferably at least 50 nm, and further preferably at least 300 nm. Also, a maximum value of the length of a side of each sheet-like silver particle P1 having the hexagonal contour is preferably at least 30 nm, and further preferably at least 100 nm. Also, an average value of the lengths of sides of the sheet-like silver particles P1 is preferably at least 100 nm and no greater than 800 nm. Specifically, an average value of the lengths of sides of the sheet-like silver particles P1 having the triangular contour is preferably at least 100 nm and no greater than 600 nm, and an average value of the lengths of sides of the sheet-like silver particles P1 having the hexagonal contour is preferably at least 100 nm and no greater than 300 nm.

The thickness of each sheet-like silver particle P1 is also controllable by adjusting the amounts (rates) of the components of the liquid mixture M and the reaction temperature. For example, the higher the reaction temperature is, the larger the thickness of each sheet-like silver particle P1 tends to be. In order to improve packability of the silver particles P, the thickness of each sheet-like silver particle P1 is preferably at least 10 nm and no greater than 100 nm, and more preferably at least 10 nm and no greater than 30 nm. Also, the sheet-like silver particles P1 having smaller thicknesses are easier to bake (sinter). Therefore, a baking temperature (sintering temperature) of a silver paste containing the silver particles P can be decreased along with a decrease in the thickness of each sheet-like silver particle P1.

The particle diameter of each spherical silver particle P2 is also controllable by adjusting the amounts (rates) of the components of the liquid mixture M and the reaction temperature. For example, the higher the reaction temperature is, the larger the particle diameter of each spherical silver particle P2 is. In order to improve packability of the silver particles P, the particle diameter of each spherical silver particle P2 is preferably at least 20 nm and no greater than 300 nm, and more preferably at least 20 nm and no greater than 150 nm. Also, an average value of the particle diameters of the spherical silver particles P2 is preferably at least 10 nm and no greater than 100 nm. The spherical silver particles P2 having smaller particle diameters are also easier to bake (sinter). Therefore, the baking temperature (sintering temperature) of the silver paste containing the silver particles P can be decreased along with a decrease in the particle diameter of each spherical silver particle P2.

According to the silver particle producing method of the present embodiment, the shape and the production yield of the silver particles P to be produced are controllable by adjusting the amounts (rates) of the pure water W, the silver compound C, the reductant R, and the dispersant D, or the amounts (rates) of the silver compound C, the reductant R, and the dispersant D. Also, the shape and the production yield of the silver particles P to be produced are controllable by adjusting the reaction temperature. Specifically, it is possible to produce the silver particles (the sheet-like silver particles P1) each having the sheet-like shape and the silver particles (the spherical silver particles P2) each having the spherical shape and a particle diameter smaller than a maximum value of the length of a side of each sheet-like silver particle. Therefore, it is possible to produce the silver particles P packability of which can be improved easily.

Also, according to the silver particle producing method of the present embodiment, the length of a side of each sheet-like silver particle P1 and the particle diameter of each spherical silver particle P2 are controllable by adjusting the amounts (rates) of the components of the liquid mixture M and the reaction temperature. In other words, the size of the sheet-like silver particles P1 and the size of the spherical silver particles P2 are controllable. Therefore, it is possible to improve packability of the silver particles to be produced.

Also, according to the silver particle producing method of the present embodiment, the silver particles P including the sheet-like silver particles P1 and the spherical silver particles P2 can be produced without application of a pressure. Therefore, the silver particles P including the sheet-like silver particles P1 and the spherical silver particles P2 can be produced easily.

Also, according to the silver particle producing method of the present embodiment, the silver particles P including the sheet-like silver particles P1 and the spherical silver particles P2 can be produced at a relatively low reaction temperature of not higher than 150° C. Therefore, the silver particles P including the sheet-like silver particles P1 and the spherical silver particles P2 can be produced easily.

Also, according to the silver particle producing method of the present embodiment, the silver particles P can be produced in an atmosphere at atmospheric pressure and room temperature. Therefore, the silver particles P including the sheet-like silver particles P1 and the spherical silver particles P2 can be produced easily.

Also, according to the silver particle producing method of the present embodiment, the sheet-like silver particles P1 and the spherical silver particles P2 can be precipitated (synthesized) in single reaction treatment (heating treatment). That is, the sheet-like silver particles P1 and the spherical silver particles P2 can be precipitated in a single container. Therefore, the silver particles P having excellent dispersibility of the sheet-like silver particles P1 and the spherical silver particles P2 can be obtained.

Also, in the silver particle producing method of the present embodiment, the liquid mixture M preferably contains the pure water W. This is because when the liquid mixture M contains the pure water W, the production yield of the silver particles P is improved as compared with that achieved when the liquid mixture M does not contain the pure water W. Further, when the liquid mixture M contains the pure water W, the length of a side of each sheet-like silver particle P1 can be adequately increased at a reaction temperature lower than that required when the liquid mixture M does not contain the pure water W. In other words, the sheet-like silver particles P1 of an adequate size can be generated at a low reaction temperature (for example, approximately 100° C.). Also, when the pure water W is used, the length of a side of each sheet-like silver particle P1 (i.e., the size of the sheet-like silver particles P1) is controllable by adjusting the amount of the pure water W. Therefore, the size of the sheet-like silver particles P1 can be controlled easily.

Also, according to the silver particle producing method of the present embodiment, the silver particles P having improved packability can be produced. Therefore, a silver paste that can be baked at a low baking temperature (sintering temperature) can be obtained using the silver particles P according to the present embodiment. Further, a silver paste that has a low resistivity after baking (sintering) can be obtained using the silver particles P having improved packability. Specifically, a volume resistivity not greater than $10^{-5}$ Ω·cm order can be attained.

Also, bonding strength of a silver paste used as a bonding material can be increased using the silver particles P having improved packability. Therefore, the silver particles P according to the present embodiment can be used for a silver paste for die attachment as well as a silver paste for wiring.

Next, the following describes a silver paste producing method and a silver paste according to the present embodiment. The silver paste producing method according to the present embodiment further includes a process of mixing the silver particles P and an organic solvent subsequently to the treatment in the silver particle producing method described above. For example, the silver particles P precipitated through the silver particle producing method described above are isolated using a centrifugal separator, and then washed using water or ethanol three or four times. The washed silver particles P are then dispersed in an organic solvent (for example, an alcohol such as ethanol). A silver paste can be produced through the procedure as described above. The produced silver paste can be used for example as a wiring material or a bonding material.

When an alcohol is used as the organic solvent, a ratio (silver particles P:alcohol) between the silver particles P and the alcohol contained in the silver paste is for example 4:1 to 16:1 in terms of parts by weight, preferably 6:1 to 12:1, and more preferably 8:1 to 10:1.

The alcohol is preferably a lower alcohol or a lower alcohol having at least one substituent selected from the group consisting of a lower alkoxy group, an amino group, and a halogen atom. Examples of lower alcohols include lower alcohols having an alkyl group having a carbon number of 1 to 6 and one to three, preferably, one or two hydroxyl groups. Examples of lower alkyl groups include straight chain or branched chain alkyl groups such as methyl group, ethyl group, n-propyl group, i-propyl group, n-butyl group, i-butyl group, sec-butyl group, t-butyl group, n-pentyl group, i-pentyl group, sec-pentyl group, t-pentyl group, 2-methylbutyl group, n-hexyl group, 1-methylpentyl group, 2-methylpentyl group, 3-methylpentyl group, 4-methylpentyl group, 1-ethylbutyl group, 2-ethylbutyl group, 1,1-dimethylbutyl group, 2,2-dimethylbutyl group, 3,3-dimethylbutyl group, and 1-ethyl-1-methylpropyl group. Examples of lower alcohols having an alkyl group having a carbon number of 1 to 6 and one to three hydroxyl groups include methanol, ethanol, ethylene glycol, n-propanol, i-propanol, triethylene glycol, n-butanol, i-butanol, sec-butanol, t-butanol, n-pentanol, i-pentanol, sec-pentanol, t-pentanol, 2-methylbutanol, n-hexanol, 1-methylpentanol, 2-methylpentanol, 3-methylpentanol, 4-methylpentanol, 1-ethylbutanol, 2-ethylbutanol, 1,1-dimethylbutanol, 2,2-dimethylbutanol, 3,3-dimethylbutanol, and 1-ethyl-1-methylpropanol.

In the lower alcohol having at least one substituent selected from the group consisting of a lower alkoxy group, an amino group, and a halogen atom, the substituent is as follows. An example of the lower alkoxy group is a lower alkyl group substituted with —O—. Examples of the lower alkoxy group include methoxy group, ethoxy group, n-propoxy group, i-propoxy group, n-butoxy group, i-butoxy group, sec-butoxy group, t-butoxy group, and n-pentyloxy group. Examples of the halogen atom include fluorine atom, bromine atom, chlorine atom, and iodine atom.

Examples of the lower alcohol having at least one substituent selected from the group consisting of a lower alkoxy group, an amino group, and a halogen atom include methoxymethanol, 2-methoxyethanol, 2-ethoxyethanol, 2-chloroethanol, and ethanolamine.

EXAMPLES

The following describes the present invention more specifically using examples. Note that the present invention is by no means limited to the scope of the examples. Each example and each comparative example described below were performed in an atmosphere at atmospheric pressure and room temperature.

Examples 1 to 3 and Comparative Example 1

A liquid mixture M was prepared by charging a container with 0.05 g of PVP, a specific amount (including 0 g) of pure water, 0.2 g of silver nitrate, and a specific amount of DMF as indicated in Table 1. Subsequently, the liquid mixture M was heated to a reaction temperature of 100° C., and thereafter reaction was caused for two hours while stirring the liquid mixture at a rotational speed of 400 rpm. After the reaction, the liquid mixture was cooled to room temperature, and precipitate was isolated using a centrifugal separator. Then, the isolated precipitate was washed using water three or four times to obtain silver particles.

TABLE 1

|  | Example 1 | Example 2 | Example 3 | Comparative example 1 |
| --- | --- | --- | --- | --- |
| PVP | 0.05 g | 0.05 g | 0.05 g | 0.05 g |
| Pure water | 20 g | 30 g | 40 g | 0 g |
| Silver nitrate | 0.2 g | 0.2 g | 0.2 g | 0.2 g |
| DMF | 30 g | 20 g | 10 g | 30 g |
| Temperature | 100° C. | 100° C. | 100° C. | 100° C. |
| rpm | 400 | 400 | 400 | 400 |
| Time | 2 h | 2 h | 2 h | 2 h |
| Particle diameter | 20-100 nm | 50-150 nm | 50-150 nm | 20-100 nm |
| Length of side of sheet | 10-500 nm | 100-800 nm | 100-800 nm | — |
| Length of side of hexagonal sheet | 10-50 nm | 100-300 nm | 100-300 nm | — |
| Length of side of triangular sheet | 150-500 nm | 500-800 nm | 500-800 nm | — |
| Thickness of sheet | 20-30 nm | 20-30 nm | 20-30 nm | — |

Table 1 also indicates results of measurement of the size of the resultant silver particles. Note that in each of Tables 1 to 6, "particle diameter" indicates the particle diameter of each spherical silver particle, "length of side of sheet" indicates the length of a side of each sheet-like silver particle, "length of side of hexagonal sheet" indicates the length of a side of each sheet-like silver particle having a hexagonal contour, "length of side of triangular sheet" indicates the length of a side of each sheet-like silver particle having a triangular contour, and "thickness of sheet" indicates the thickness of each sheet-like silver particle. The "particle diameter" and the "length of side of sheet" were measured using SEM images. The "thickness of sheet" was measured using an SEM.

Figure 3:
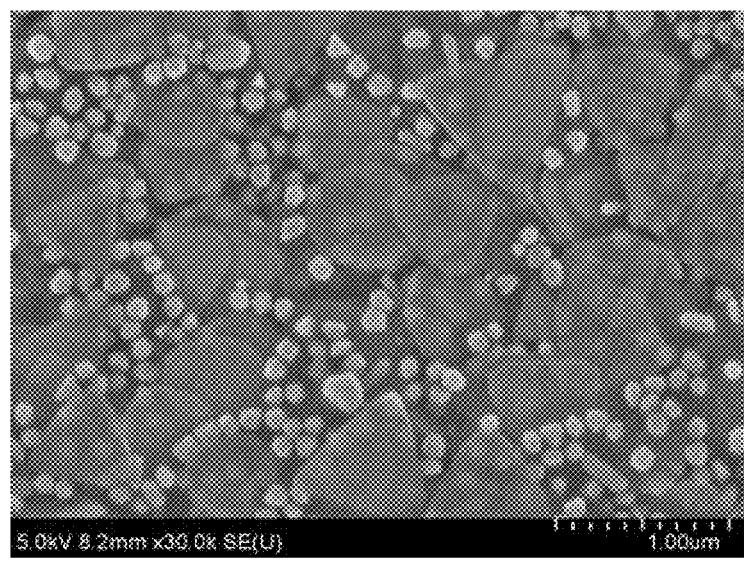
FIG. 3 is a photograph showing an SEM image according to example 2 of the present invention.
Figure 4:
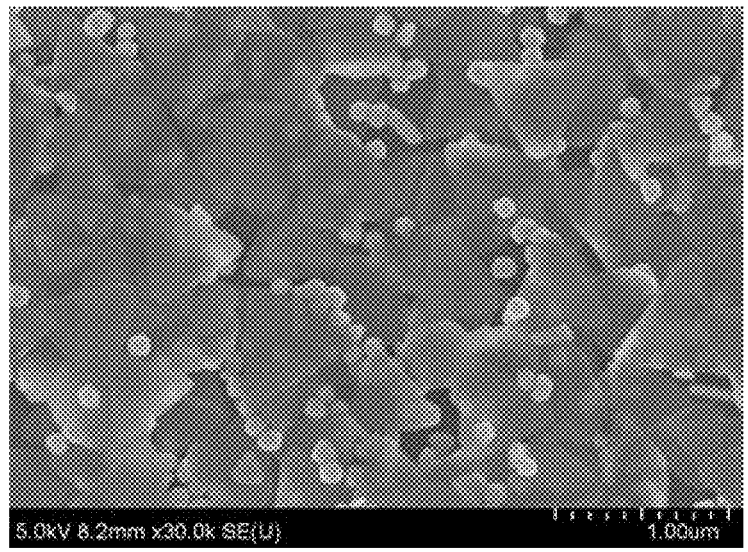
FIG. 4 is a photograph showing an SEM image according to example 3 of the present invention.
Figure 5:
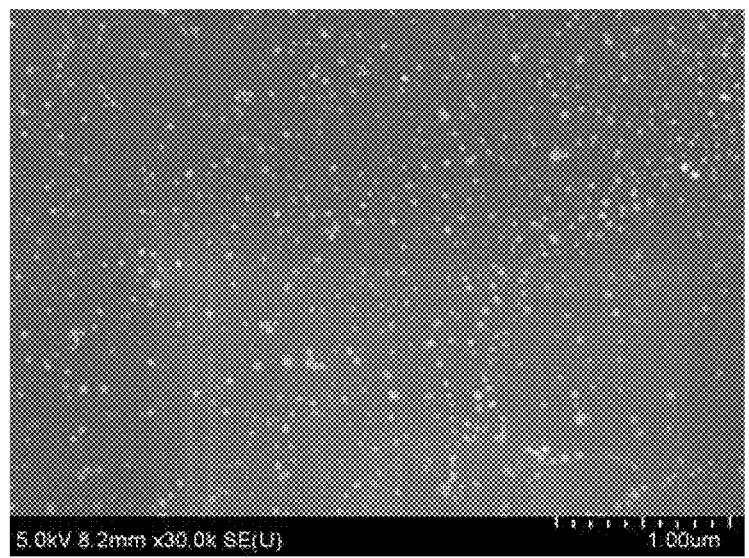
FIG. 5 is a photograph showing an SEM image according to comparative example 1 of the present invention.

Also, SEM images of the resultant silver particles are shown in FIGS. 2 to 5. FIG. 2 shows an SEM image according to example 1. FIG. 3 shows an SEM image according to example 2. FIG. 4 shows an SEM image according to example 3. FIG. 5 shows an SEM image according to comparative example 1.

As indicated in Table 1, the examples 1 to 3 were performed under the same conditions except that the rates (amounts) of the pure water and DMF were changed. As shown in FIGS. 2 to 4 (the examples 1 to 3), when the pure water was used, sheet-like silver particles could be obtained as well as spherical silver particles under the reaction temperature of 100° C. By contrast, as shown in FIG. 5 (the comparative example 1), when the pure water was not used, only spherical silver particles were precipitated under the reaction temperature of 100° C., and sheet-like silver particles could not be obtained.

Also, as indicated in Table 1, the results show that the particle diameter of each spherical silver particle and the length of a side of each sheet-like silver particle are controllable by adjusting the rate (amount) of the pure water. Specifically, it was found that the particle diameter of each spherical silver particle and the length of a side of each sheet-like silver particle tend to increase along with an increase in the rate of the pure water. By contrast, the thickness of each sheet-like silver particle was not influenced by changes in the rates (amounts) of the pure water and DMF.

Examples 4 and 5

Figure 6:
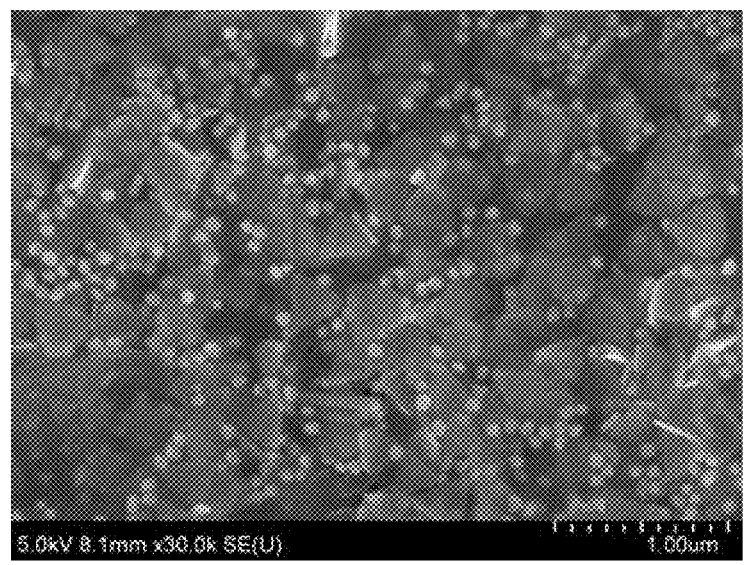
FIG. 6 is a photograph showing an SEM image according to example 4 of the present invention.
Figure 7:
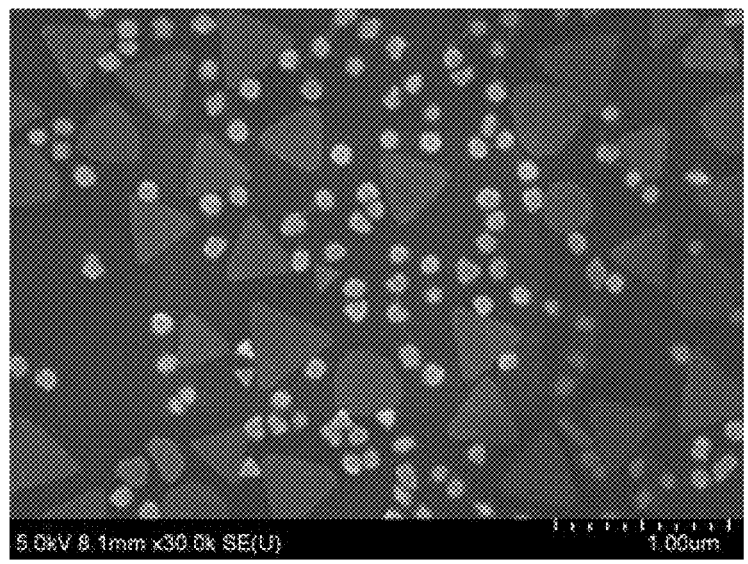
FIG. 7 is a photograph showing an SEM image according to example 5 of the present invention.

Examples 4 and 5 were performed under the same conditions as the examples 2 and 3 except that the amount of PVP was changed. Specifically, as indicated in Table 2, 0.2 g of PVP was contained in the liquid mixture M. Table 2 also indicates results of measurement of the size of the resultant silver particles. Also, SEM images of the resultant silver particles are shown in FIGS. 6 and 7. FIG. 6 shows an SEM image according to the example 4, and FIG. 7 shows an SEM image according to the example 5.

TABLE 2

|  | Example 4 | Example 5 |
| --- | --- | --- |
| PVP | 0.2 g | 0.2 g |
| Pure water | 30 g | 40 g |
| Silver nitrate | 0.2 g | 0.2 g |
| DMF | 20 g | 10 g |
| Temperature | 100° C. | 100° C. |
| rpm | 400 | 400 |
| Time | 2 h | 2 h |
| Particle diameter | 50-150 nm | 50-150 nm |
| Length of side of sheet | 50-500 nm | 100-300 nm |
| Length of side of hexagonal sheet | 50-100 nm | 100-200 nm |
| Length of side of triangular sheet | 300-500 nm | 100-300 nm |
| Thickness of sheet | 20-30 nm | 20-30 nm |

As shown in FIGS. 6 and 7, spherical silver particles and sheet-like silver particles could be obtained also when the amount of PVP was increased. Meanwhile, as indicated in Tables 1 and 2, the results show that the length of a side of each sheet-like silver particle is controllable by adjusting the amount of PVP. Specifically, it was found that the length of a side of each sheet-like silver particle tends to decrease along with an increase in the amount of PVP. By contrast, the particle diameter of each spherical silver particle and the thickness of each sheet-like silver particle were not influenced by a change in the amount of PVP.

Example 6 and Comparative Example 2

Figure 8:
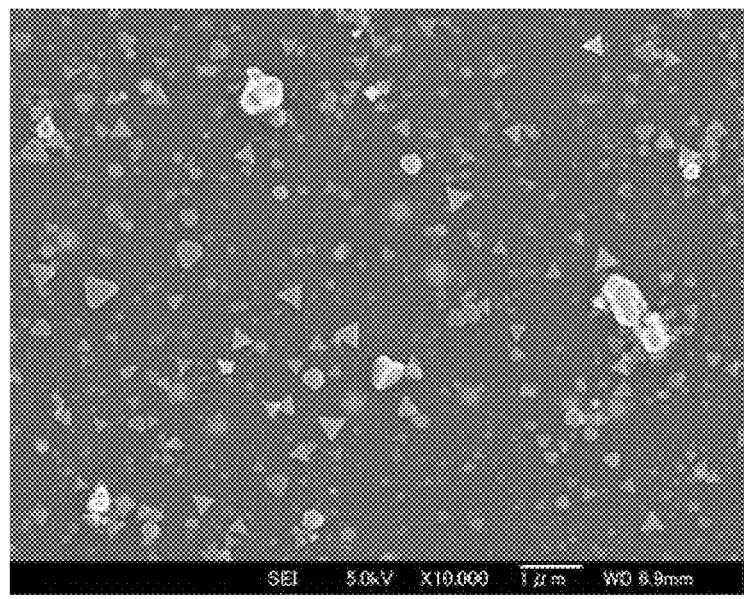
FIG. 8 is a photograph showing an SEM image according to example 6 of the present invention.
Figure 9:
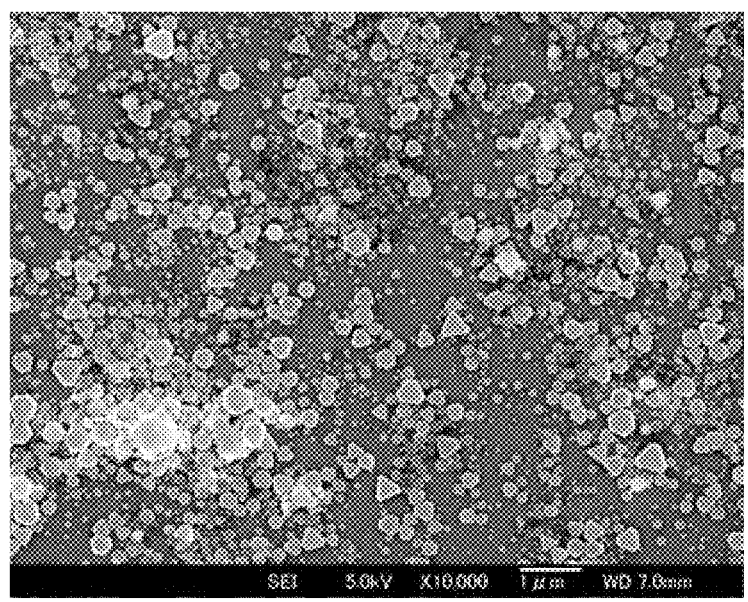
FIG. 9 is a photograph showing an SEM image according to comparative example 2 of the present invention.

A liquid mixture M was prepared by charging a container with a specific amount of PVP, 0.2 g of silver nitrate, and 30 g of DMF as indicated in Table 3 without using pure water. Subsequently, the liquid mixture M was heated to a reaction temperature of 150° C. Subsequent treatment was performed similarly to the examples 1 to 3. Table 3 also indicates results of measurement of the size of the resultant silver particles. Also, SEM images of the resultant silver particles are shown in FIGS. 8 and 9. FIG. 8 shows an SEM image according to example 6, and FIG. 9 shows an SEM image according to comparative example 2.

TABLE 3

|  | Example 6 | Comparative example 2 |
| --- | --- | --- |
| PVP | 0.2 g | 0.05 g |
| Pure water | 0 g | 0 g |
| Silver nitrate | 0.2 g | 0.2 g |
| DMF | 30 g | 30 g |
| Temperature | 150° C. | 150° C. |
| rpm | 400 | 400 |
| Time | 2 h | 2 h |
| Particle diameter | 20-100 nm | 20-100 nm |
| Length of side of sheet | 10-300 nm | 10-300 nm |
| Length of side of hexagonal sheet | 10-100 nm | 10-50 nm |
| Length of side of triangular sheet | 50-300 nm | 50-300 nm |
| Thickness of sheet | 30-100 nm | 30-200 nm |

As shown in FIGS. 8 and 9, when the reaction temperature was 150° C., spherical silver particles and sheet-like silver particles could be obtained although pure water was not used.

Also, the results show that the contour of the sheet-like silver particles is controllable by adjusting the amount of PVP. Specifically, when the amount of PVP was large (the example 6), sheet-like silver particles having a triangular contour were precipitated more than sheet-like silver particles having a hexagonal contour, as shown in FIG. 8. By contrast, when the amount of PVP was small (the comparative example 2), sheet-like silver particles having a hexagonal contour were precipitated more than sheet-like silver particles having a triangular contour, as shown in FIG. 9. Note that when pure water was not used, the particle diameter of each spherical silver particle and the length of a side of each sheet-like silver particle having a triangular contour were not influenced by a change in the amount of PVP. By contrast, it was found that the length of a side of each sheet-like silver particle having a hexagonal contour tends to decrease along with a decrease in the amount of PVP. Also, it was found that the thickness of each sheet-like silver particle tends to increase along with a decrease in the amount of PVP. Note that in the comparative example 2, a maximum value of the thickness of each sheet-like silver particle was larger than a maximum value of the particle diameter of each spherical silver particle.

Example 7

Example 7 was performed under the same conditions as the example 3 except that the reaction temperature was changed. Specifically, as indicated in Table 4, the reaction was performed under a reaction temperature of 150° C. Table 4 also indicates results of measurement of the size of the resultant silver particles. Also, an SEM image of the resultant silver particles is shown in FIG. 10.

TABLE 4

|  | Example 7 |
| --- | --- |
| PVP | 0.05 g |
| Pure water | 40 g |
| Silver nitrate | 0.2 g |
| DMF | 10 g |
| Temperature | 150° C. |
| rpm | 400 |
| Time | 2 h |
| Particle diameter | 50-300 nm |
| Length of side of sheet | 100-800 nm |
| Length of side of hexagonal sheet | 100-300 nm |
| Length of side of triangular sheet | 300-800 nm |
| Thickness of sheet | 50-100 nm |

Figure 10:
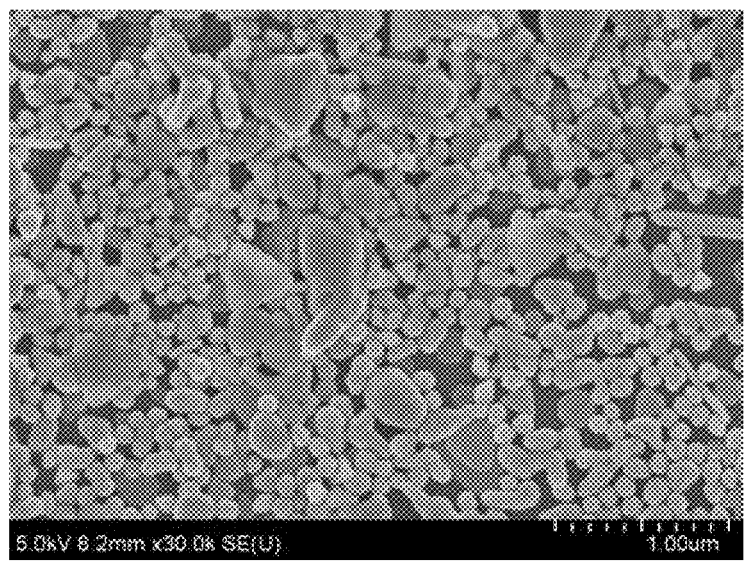
FIG. 10 is a photograph showing an SEM image according to example 7 of the present invention.

As shown in FIGS. 4 and 10 and Tables 1 and 4, the results show that the particle diameter of each spherical silver particle and the thickness of each sheet-like silver particle are controllable by controlling the reaction temperature. Specifically, it was found that the particle diameter of each spherical silver particle and the thickness of each sheet-like silver particle tend to increase along with an increase in the reaction temperature.

Examples 8 and 9 and Comparative Example 3

Figure 11:
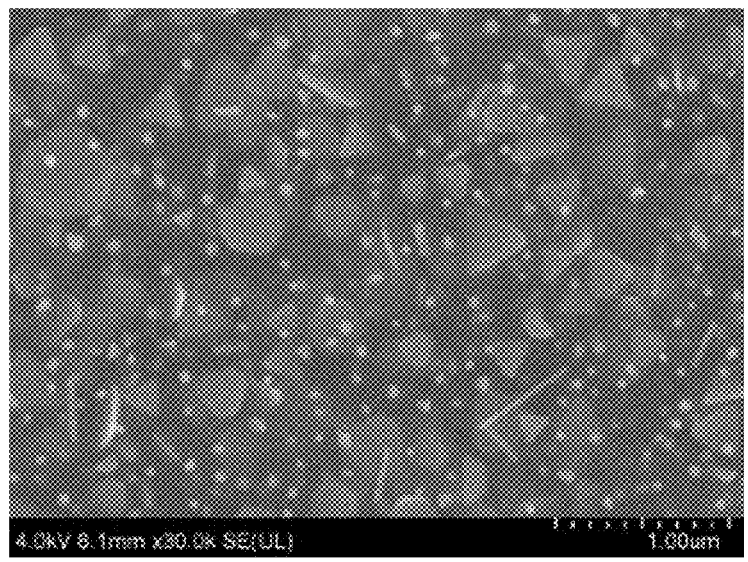
FIG. 11 is a photograph showing an SEM image according to example 8 of the present invention.
Figure 12:
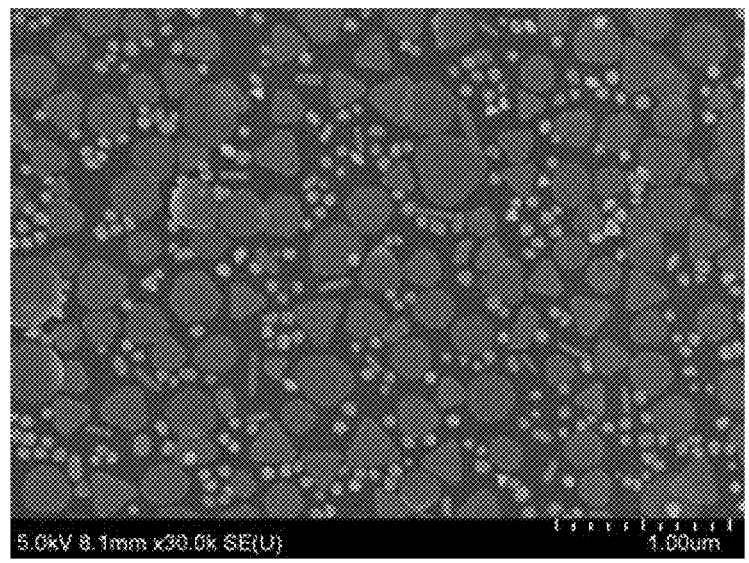
FIG. 12 is a photograph showing an SEM image according to example 9 of the present invention.
Figure 13:
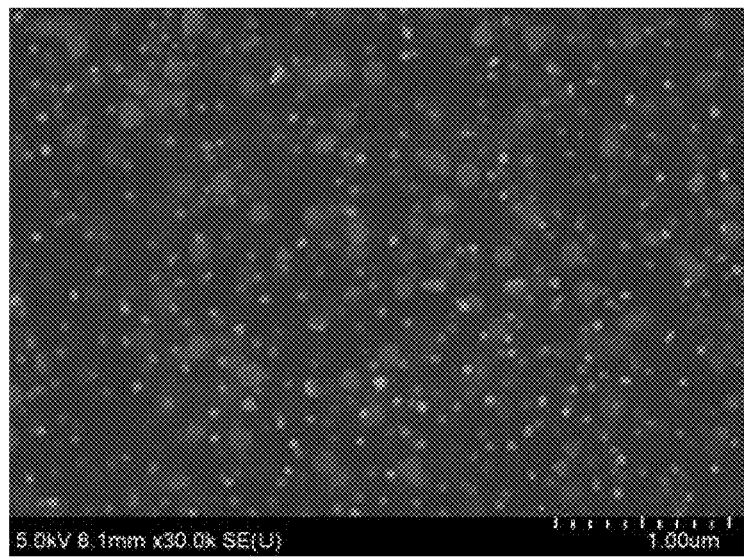
FIG. 13 is a photograph showing an SEM image according to comparative example 3 of the present invention.

A liquid mixture M was prepared by charging a container with 0.2 g of PVP, 20 g of pure water, 0.2 g of silver nitrate, and 30 g of DMF as indicated in Table 5. Subsequently, the liquid mixture M was heated to a specific reaction temperature. Subsequent treatment was performed similarly to the examples 1 to 3. Table 5 also indicates results of measurement of the size of the resultant silver particles. Also, SEM images of the resultant silver particles are shown in FIGS. 11 to 13. FIG. 11 shows an SEM image according to example 8. FIG. 12 shows an SEM image according to example 9. FIG. 13 shows an SEM image according to comparative example 3.

TABLE 5

|  | Example 8 | Example 9 | Comparative example 3 |
| --- | --- | --- | --- |
| PVP | 0.2 g | 0.2 g | 0.2 g |
| Pure water | 20 g | 20 g | 20 g |
| Silver nitrate | 0.2 g | 0.2 g | 0.2 g |
| DMF | 30 g | 30 g | 30 g |
| Temperature | 120° C. | 150° C. | 80° C. |
| rpm | 400 | 400 | 400 |
| Time | 2 h | 2 h | 2 h |
| Particle diameter | 20-100 nm | 50-150 nm | 20-100 nm |
| Length of side of sheet | 50-300 nm | 50-500 nm | 10-100 nm |
| Length of side of hexagonal sheet | 50-300 nm | 50-200 nm | 10-50 nm |
| Length of side of triangular sheet | 50-300 nm | 100-500 nm | 50-100 nm |
| Thickness of sheet | 30-100 nm | 30-100 nm | 30-100 nm |

As indicated in Table 5, the examples 8 and 9 and the comparative example 3 were performed under the same conditions except that the reaction temperature was changed. As shown in FIGS. 11 to 13, spherical silver particles and sheet-like silver particles could be obtained under each reaction temperature.

Also, as indicated in Table 5, the results show that the particle diameter of each spherical silver particle and the length of a side of each sheet-like silver particle are controllable by adjusting the reaction temperature. Specifically, it was found that the length of a side of each sheet-like silver particle and the particle diameter of each spherical silver particle tend to increase along with an increase in the reaction temperature. However, as for the sheet-like silver particles having a hexagonal contour, a maximum value of the length of a side was larger when the reaction temperature was 120° C. than when the reaction temperature was 150° C. Note that in the comparative example 3 performed under a reaction temperature of 80° C., which is lower than 100° C., a maximum value of the length of a side of each sheet-like silver particle was 100 nm, which was the same as a maximum value of the particle diameter of each spherical silver particle.

Examples 10 and 11

Figure 14:
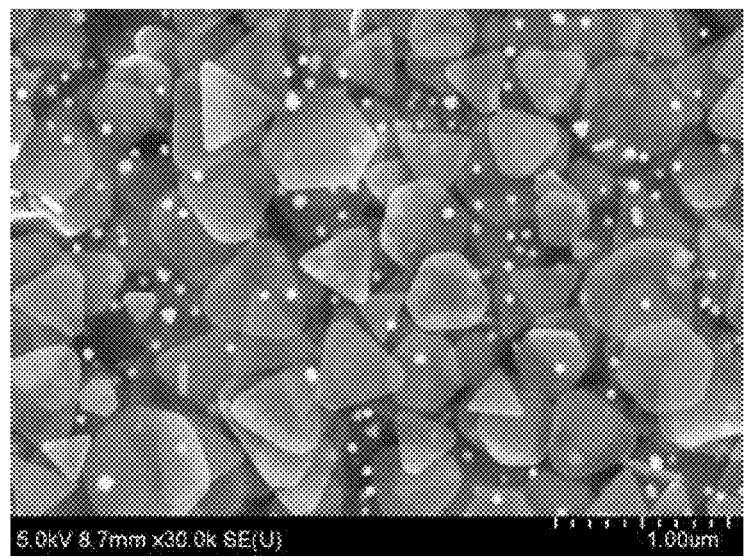
FIG. 14 is a photograph showing an SEM image according to example 10 of the present invention.
Figure 15:
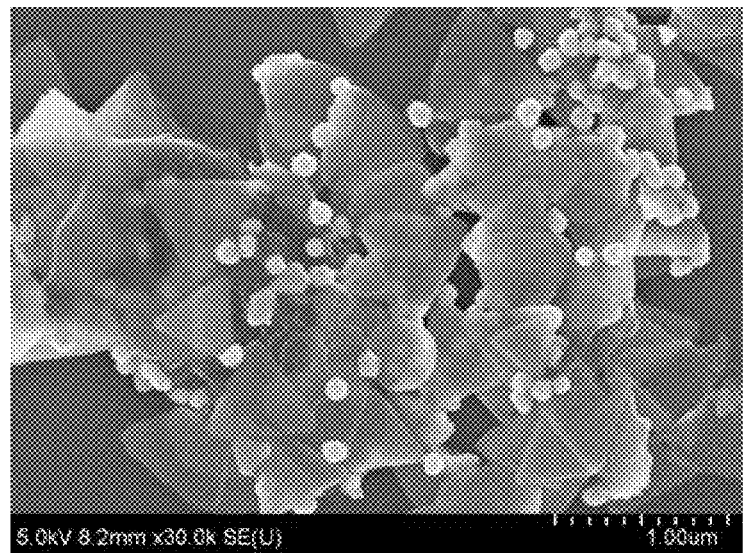
FIG. 15 is a photograph showing an SEM image according to example 11 of the present invention.

A liquid mixture M was prepared by charging a container with 0.25 g of PVP, a specific amount of pure water, 1.1 g of silver nitrate, and a specific amount of DMF as indicated in Table 6. Subsequently, the liquid mixture M was heated to a reaction temperature of 100° C. Subsequent treatment was performed similarly to the examples 1 to 3. Table 6 also indicates results of measurement of the size of the resultant silver particles. Also, SEM images of the resultant silver particles are shown in FIGS. 14 and 15. FIG. 14 shows an SEM image according to example 10, and FIG. 15 shows an SEM image according to example 11.

TABLE 6

|  | Example 10 | Example 11 |
| --- | --- | --- |
| PVP | 0.25 g | 0.25 g |
| Pure water | 100 g | 150 g |
| Silver nitrate | 1.1 g | 1.1 g |
| DMF | 150 g | 100 g |
| Temperature | 100° C. | 100° C. |
| rpm | 400 | 400 |
| Time | 2 h | 2 h |
| Particle diameter | 20-100 nm | 50-150 nm |
| Length of side of sheet | 100-500 nm | 100-800 nm |
| Length of side of hexagonal sheet | 100-300 nm | 100-500 nm |
| Length of side of triangular sheet | 150-500 nm | 500-800 nm |
| Thickness of sheet | 20-30 nm | 20-30 nm |

As indicated in Table 6, the amount of silver nitrate was increased in the examples 10 and 11 as compared with the other examples 1 to 9. Also, the amount of PVP and the like were increased as appropriate along with the increase in the amount of silver nitrate. As shown in FIGS. 14 and 15, sheet-like silver particles could be obtained as well as spherical silver particles also when the amount of silver nitrate was increased. Also, as a result of the increase in the amount of silver nitrate, a large amount of silver particles (the sheet-like silver particles and the spherical silver particles) were synthesized at a time.

Examples 12 to 16

Figure 16A:
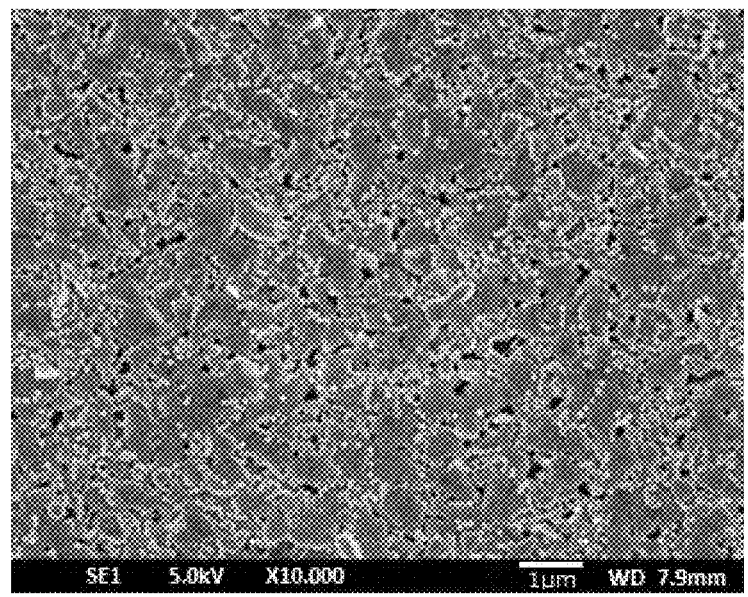
FIG. 16A is a photograph showing an SEM image according to example 14 of the present invention.
Figure 16B:
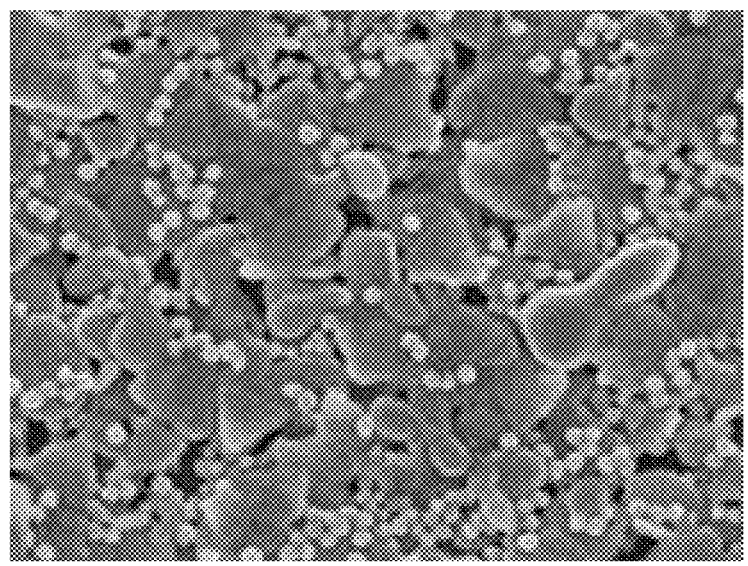
FIG. 16B is a photograph showing a part of FIG. 16A in an enlarged scale.
Figure 17A:
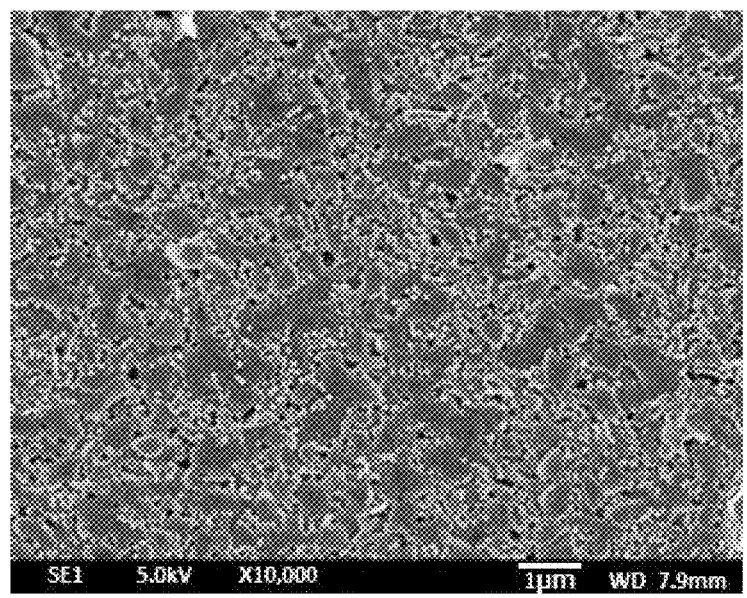
FIG. 17A is a photograph showing an SEM image according to example 15 of the present invention.
Figure 17B:
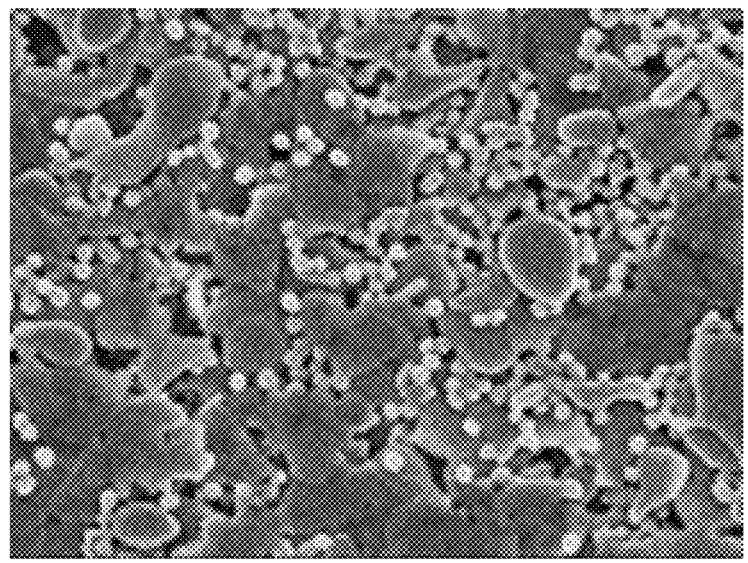
FIG. 17B is a photograph showing a part of FIG. 17A in an enlarged scale.
Figure 18A:
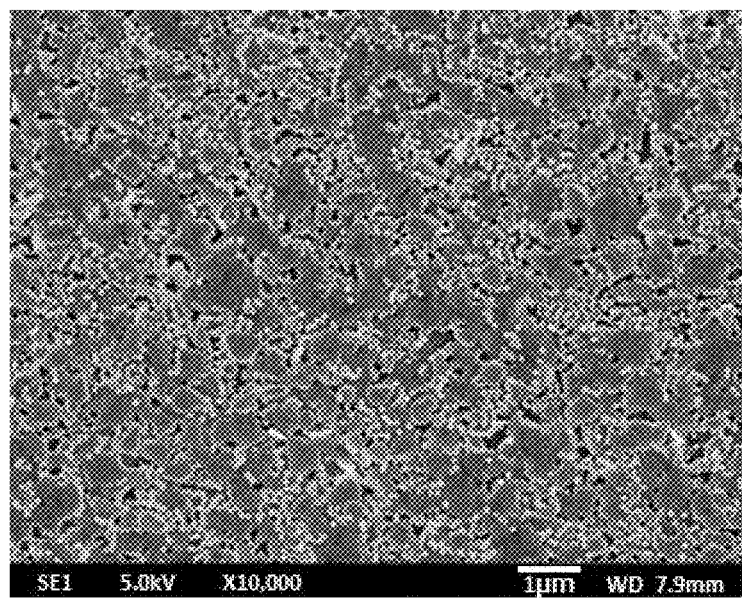
FIG. 18A is a photograph showing an SEM image according to example 16 of the present invention.
Figure 18B:
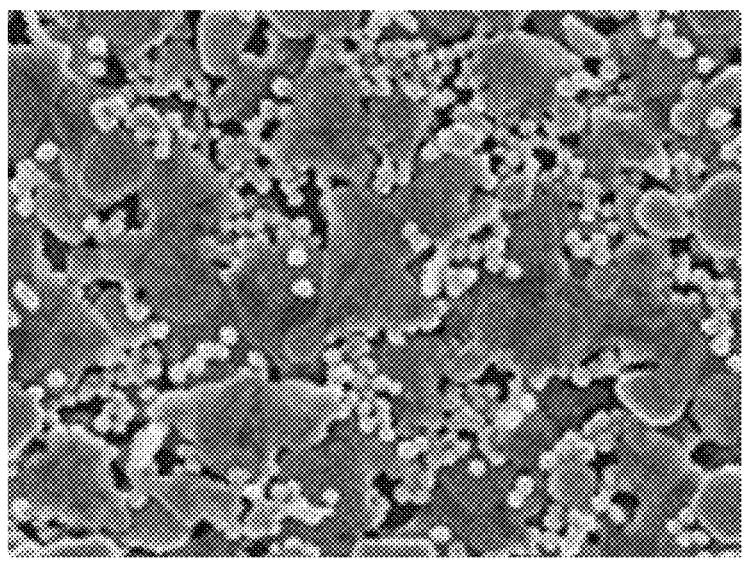
FIG. 18B is a photograph showing a part of FIG. 18A in an enlarged scale.

A liquid mixture M was prepared by charging a container with 0.25 g of PVP, 100 g of pure water, 1.1 g of silver nitrate, and 150 g of DMF as indicated in Table 7. Subsequently, the liquid mixture M was heated to a reaction temperature of 100° C., and thereafter reaction was caused for two hours while stirring the liquid mixture at a rotational speed of 400 rpm. After the reaction, the liquid mixture was cooled to room temperature, and precipitate was isolated using a centrifugal separator. Then, the isolated precipitate was washed using water three or four times, and thereafter dispersed in ethanol to obtain a silver paste. The resultant silver paste was baked for 30 minutes at a specific baking temperature indicated in Table 8, and thereafter a volume resistivity was measured. Table 8 also indicates results of the measurement. Also, FIG. 16A shows an SEM image (example 14) of a silver paste baked at a baking temperature of 150° C. FIG. 16B shows a part of FIG. 16A in an enlarged scale. Similarly, FIG. 17A shows an SEM image (example 15) of a silver paste backed at a baking temperature of 180° C., and FIG. 18A shows an SEM image (example 16) of a silver paste backed at a baking temperature of 200° C. FIG. 17B shows a part of FIG. 17A in an enlarged scale, and FIG. 18B shows a part of FIG. 18A in an enlarged scale.

TABLE 7

| | Examples 12-16 |
|---|---|
| PVP | 0.25 g |
| Pure water | 100 g |
| Silver nitrate | 1.1 g |
| DMF | 150 g |
| Temperature | 100° C. |
| rpm | 400 |
| Time | 2 h |

TABLE 8

| | Example 12 | Example 13 | Example 14 | Example 15 | Example 16 |
|---|---|---|---|---|---|
| Baking temperature | 100° C. | 130° C. | 150° C. | 180° C. | 200° C. |
| Resistivity (µΩ · cm) | 84 | 71 | 29 | 17 | 8 |

As indicated in Table 8, a sufficiently low resistivity (volume resistivity of $10^{-5}$ Ω·cm order) could be attained even when baking was performed at a temperature as low as 150° C. It is supposed that this is because silver particles contained in the silver paste had excellent packability as shown in FIGS. 16 to 18. Also, the volume resistivity decreased along with an increase in the baking temperature. In particular, a volume resistivity of $10^{-6}$ Ω·cm order could be attained when the baking temperature was 200° C.

Example 17

A liquid mixture M was prepared by charging a container with 0.25 g of PVP, 150 g of pure water, 1.1 g of silver nitrate, and 100 g of DMF as indicated in Table 9. Subsequently, the liquid mixture M was heated to a reaction temperature of 100° C., and thereafter reaction was caused for two hours while stirring the liquid mixture at a rotational speed of 400 rpm. After the reaction, the liquid mixture was cooled to room temperature, and precipitate was isolated using a centrifugal separator. Then, the isolated precipitate was washed using water three or four times, and thereafter dispersed in ethanol to obtain a silver paste. Then, a shear strength test of the resultant silver paste was performed to determine bonding strength of the silver paste.

TABLE 9

| | Example 17 |
|---|---|
| PVP | 0.25 g |
| Pure water | 150 g |

TABLE 9-continued

| | Example 17 |
|---|---|
| Silver nitrate | 1.1 g |
| DMF | 100 g |
| Temperature | 100° C. |
| rpm | 400 |
| Time | 2 h |

Figure 19:
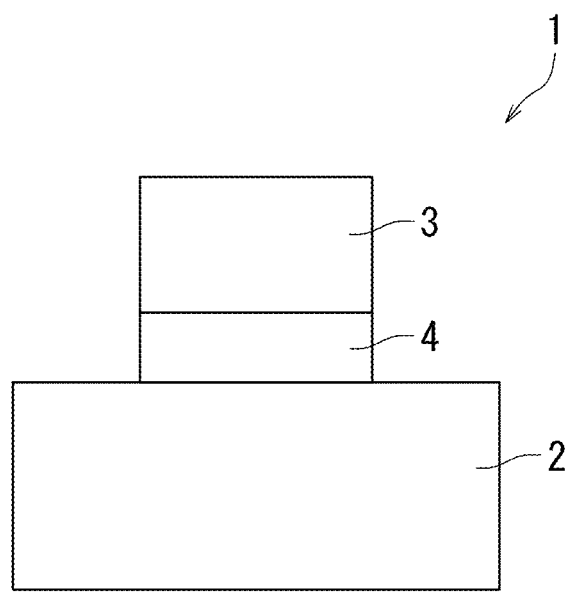
FIG. 19 is a schematic illustration of a bonding sample used in a shear strength test according to example 17 of the present invention.

FIG. 19 is a schematic illustration of a bonding sample 1 used in the shear strength test of example 17. As illustrated in FIG. 19, the bonding sample 1 includes a silver-plated copper substrate 2, a silver-plated copper substrate 3, and a silver paste 4. The silver paste 4 bonds the copper substrate 2 and the copper substrate 3 together. Specifically, the silver paste 4 was printed on the copper substrate 2 of 8 mm×8 mm using a mask of 0.1 µm, and thereafter the copper substrate 3 of 4 mm×4 mm was placed on the printed silver paste 4. Subsequently, the copper substrates 2 and 3 were heated at a temperature of 200° C. for 60 minutes in an atmosphere at atmospheric pressure to bake (sinter) the silver paste 4, thereby bonding the copper substrates 2 and 3 together. Subsequently, shear force was applied to the copper substrates 2 and 3 bonded together and the shear strength was measured. As a result of the measurement, it was found that the shear strength was 20.1 MPa.

Figure 20:
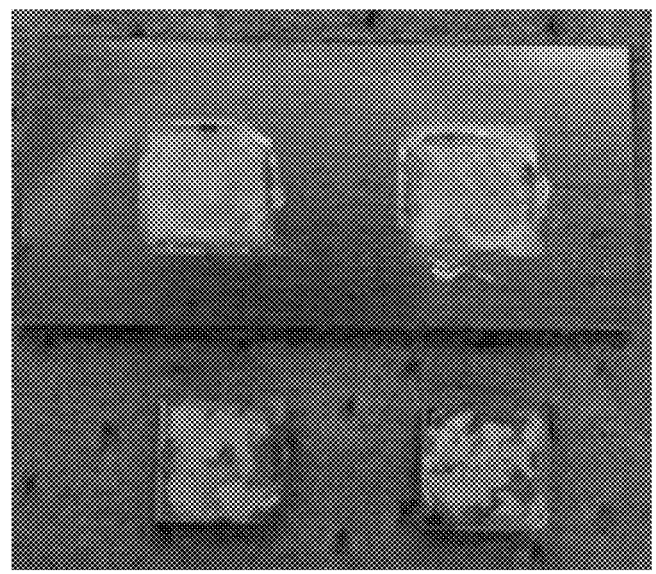
FIG. 20 is a photograph showing an image of copper substrates after measurement of shear strength, which image was taken from a side coated with a silver paste.
Figure 21:
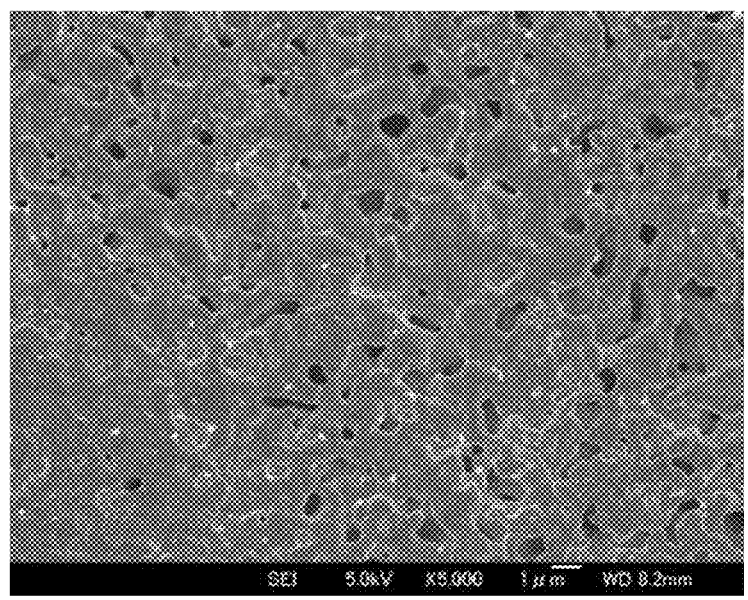
FIG. 21 is a photograph showing an SEM image of the silver paste after the measurement of the shear strength.

FIG. 20 shows an image of the copper substrates 2 and 3 after the measurement of the shear strength (after the shear strength test), which image was taken from a side coated with the silver paste 4. FIG. 21 shows an SEM image of the silver paste after the measurement of the shear strength. As shown in FIG. 21, silver particles contained in the silver paste 4 were formed into a dense film through the baking. It is supposed that this is because the silver particles contained in the silver paste 4 before the backing had excellent packability. Also, it is supposed that the shear strength of not lower than 15 MPa could be attained as a result of the silver particles formed into the dense film.

INDUSTRIAL APPLICABILITY

The present invention is applicable to for example a material of a wiring printed on a wiring board or a bonding material for die attachment.

REFERENCE SIGNS LIST

1 Bonding sample
2 Copper substrate
3 Copper substrate
4 Silver paste

The invention claimed is:
1. A silver particle producing method comprising:
obtaining a liquid mixture by mixing a silver compound, a reductant, a dispersant, and water; and
heating the liquid mixture to cause reaction between the silver compound and the reductant and generate first silver particles and second silver particles, the first silver particles each having a sheet-like or plate-like shape, and the second silver particles each having a spherical shape or a shape closer to a sphere than the first silver particles and a particle diameter smaller than a maximum value of a length of a side of each of the first silver particles, wherein
the reductant is N,N-dimethylformamide, the reaction between the silver compound and the reductant is caused at a reaction temperature not lower than 100° C. and lower than 150° C., an amount of the silver compound is at least 0.1 parts by weight and no greater than 20 parts by weight relative to 100 parts by weight of the liquid mixture, an amount of the reductant is at least 10 parts by weight and smaller than 100 parts by weight relative to 100 parts by weight of the liquid mixture, an amount of the dispersant is at least 0.1 parts by weight and no greater than 20 parts by weight relative to 100 parts by weight of the liquid mixture, and an amount of the water is at least 40 parts by weight and smaller than 100 parts by weight relative to 100 parts by weight of the liquid mixture.

2. The silver particle producing method according to claim 1, wherein
the reaction between the silver compound and the reductant is caused under atmospheric pressure.

3. The silver particle producing method according to claim 1, further comprising
after generating the first silver particles and the second silver particles through the reaction between the silver compound and the reductant, isolating the first silver particles and the second silver particles by centrifugal separation, wherein
among the first silver particles and the second silver particles isolated by the centrifugal separation, the number of the second silver particles is larger than the number of the first silver particles.

4. The silver particle producing method according to claim 1, wherein
an average value of the lengths of the sides of the first silver particles is at least 100 nm and no greater than 800 nm, and
an average value of the particle diameters of the second silver particles is at least 10 nm and no greater than 100 nm.

5. The silver particle producing method according to claim 1, wherein
the length of the side of each of the first silver particles is at least 10 nm and no greater than 800 nm.

6. The silver particle producing method according to claim 5, wherein
the first silver particles include silver particles having a triangular contour and silver particles having a hexagonal contour.

7. The silver particle producing method according to claim 6, wherein
a rate of the silver particles having the triangular contour is larger than a rate of the silver particles having the hexagonal contour.

8. The silver particle producing method according to claim 6, wherein
a maximum value of a length of a side of each of the silver particles having the triangular contour is at least 50 nm.

9. The silver particle producing method according to claim 6, wherein
a maximum value of a length of a side of each of the silver particles having the hexagonal contour is at least 30 nm.

10. The silver particle producing method according to claim 1, wherein
the particle diameter of each of the second silver particles is at least 20 nm and no greater than 150 nm.

11. The silver particle producing method according to claim 1, wherein
a thickness of each of the first silver particles is at least 10 nm and no greater than 100 nm.

12. The silver particle producing method according to claim 11, wherein
the thickness of each of the first silver particles is no greater than 30 nm.

13. A silver paste producing method comprising:
washing the first silver particles and the second silver particles produced by the method according to claim 1; and
dispersing in an organic solvent the first silver particles after the washing and the second silver particles after the washing.

* * * * *